United States Patent
Aso et al.

(10) Patent No.: US 9,439,073 B2
(45) Date of Patent: Sep. 6, 2016

(54) SERVER AND COMMUNICATION TERMINAL

(71) Applicant: Panasonic Intellectual Property Corporation of America, Torrance, CA (US)

(72) Inventors: Keigo Aso, Osaka (JP); Genadi Velev, Darmstadt (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 143 days.

(21) Appl. No.: 14/236,451

(22) PCT Filed: Apr. 23, 2013

(86) PCT No.: PCT/JP2013/002741
§ 371 (c)(1),
(2) Date: Jan. 31, 2014

(87) PCT Pub. No.: WO2014/006803
PCT Pub. Date: Jan. 9, 2014

(65) Prior Publication Data
US 2014/0177583 A1 Jun. 26, 2014

(30) Foreign Application Priority Data
Jul. 2, 2012 (JP) ................ 2012-148619

(51) Int. Cl.
*H04W 72/04* (2009.01)
*H04W 12/08* (2009.01)
*H04W 4/00* (2009.01)
*H04L 29/06* (2006.01)
*H04W 76/02* (2009.01)

(52) U.S. Cl.
CPC ............ *H04W 12/08* (2013.01); *H04L 63/126* (2013.01); *H04W 4/005* (2013.01); *H04W 76/021* (2013.01)

(58) Field of Classification Search
CPC . H04W 76/02; H04W 76/022; H04W 48/18; H04W 80/04
USPC .................................. 370/328–332
See application file for complete search history.

(56) References Cited

U.S. PATENT DOCUMENTS 7,492,753 B2 * 2/2009 Smavatkul et al. .......... 370/346
8,041,335 B2 * 10/2011 Khetawat et al. ......... 455/404.2
(Continued)

FOREIGN PATENT DOCUMENTS

| JP | 2001-103155 A | 4/2001 |
| JP | 2006-14188 A | 1/2006 |
| WO | 2011/127320 A1 | 10/2011 |

OTHER PUBLICATIONS

"3rd Generation Partnership Project; Technical Specification Group Services and System Aspects; System Improvements for Machine-Type Communications", 3GPP TR 23.888, V1.6.1, Feb. 2012.
(Continued)

*Primary Examiner* — Dang Ton
*Assistant Examiner* — Sai Aung
(74) *Attorney, Agent, or Firm* — Pearne & Gordon LLP

(57) ABSTRACT

Disclosed is a technique for reporting the IP address of a UE using a response message to a device trigger. A control message receiving unit receives, from a network, a control message generated based on a trigger request message transmitted from the predetermined communication device for requesting the transmission of the control message to a communication terminal. A determining unit determines whether to perform communication with the predetermined communication device using an IP packet. A connection management unit acquires an IP address allocated to an IP connection used in communication with the predetermined communication device when determining to perform the communication using the IP packet at the time of receiving the control message at the control message receiving unit. A response message transmitting unit transmits a response message to the control message to the network, where the response message includes the IP address acquired by the connection management unit.

9 Claims, 11 Drawing Sheets

(56) References Cited

U.S. PATENT DOCUMENTS

| | | | |
|---|---|---|---|
| 2002/0196797 A1 | 12/2002 | Battin | |
| 2012/0004003 A1* | 1/2012 | Shaheen et al. | 455/509 |
| 2012/0008578 A1* | 1/2012 | Kant et al. | 370/329 |
| 2012/0057569 A1* | 3/2012 | Xie et al. | 370/331 |
| 2013/0089076 A1* | 4/2013 | Olvera-Hernandez et al. | 370/332 |
| 2013/0155948 A1* | 6/2013 | Pinheiro et al. | 370/328 |
| 2014/0161055 A1* | 6/2014 | Chitrapu et al. | 370/329 |

OTHER PUBLICATIONS

"3rd Generation Partnership Project; Technical Specification Group Services and System Aspects; Service requirements for machine-type communications", 3GPP TS 22.368, V11.4.0, Mar. 2012.

"3rd Generation Partnership Project; Technical Specification Group Services and System Aspects; Architecture Enhancements to facilitate communications with Packet Data Networks and Applications", 3GPP TS 23.682, V11.1.0, Jun. 2012.

"3rd Generation Partnership Project; Technical Specification Group Services and System Aspects; General Packet Radio Service (GPRS) enhancements for Evolved Universal Terrestrial Radio Access Network", 3GPP TS 23.401 V11.2.0, Jun. 2012.

International Search Report for Application No. PCT/JP2013/002741 dated Aug. 6, 2013.

"3rd Generation Partnership Project; Technical Specification Group Services and System Aspects; System Improvements for Machine-Type Communications", 3GPP TR 23.888, V1.0.0, Jul. 2010.

* cited by examiner

SERVER AND COMMUNICATION TERMINAL

TECHNICAL FIELD

The present disclosure relates to a communication technique using a cellular communication function, and particularly to a server and a communication terminal for performing communication using a technique for communication between machines (called Machine to Machine Communication or Machine Type Communication, which is referred to as M2M communication (or MTC) below)).

BACKGROUND ART

The cellular communication function is not only used in voice communication and data communication between cellular phones and smartphones, but also widely used in devices for M2M communication (also called MTC devices). The number of cellular communication terminals (hereinafter referred to as UEs (User Equipment) or communication terminals) including MTC devices will continue to increase in the future.

When a user and an application (hereinafter also called an MTC application, an application server, or an AS (Application Server)) operated by the user transmit application data (hereinafter also called an application PDU, an application payload, or data) to a UE, the data can be passed to an SCS (called also a Service Capability Server or an MTC server, or simply a server) to request the SCS to transmit the data to the UE (Indirect Model). The SCS that received the data from the AS uses an appropriate transmission method to transmit the data to the UE. As the transmission method, for example, there is a method of creating an IP packet addressed to the IP address of the UE to transmit the data to the UE as an application data packet, or a method of transmitting the data by including the data in a control message to be transmitted to an entity within a cellular network. In the case of using the control message, the SCS transmits the control message including the data to an IWF (Interworking Function) as a gateway to the cellular network.

This message is called a device trigger request (hereinafter also called a trigger request). The MTC-IWF that received the device trigger request selects a method of reporting trigger information such as data to the UE to start transmission processing. For a message (device trigger, which is also called a trigger below) for reporting the trigger information to the UE, there can be used a method of transmitting it as an SMS (Short Message Service) message through an SMS-SC, a method of transmitting it as a CBS (Cell Broadcast Service) message through a CBC, a method of transmitting it as an MBMS (Multicast Broadcast Message Service) message, or further a method of transmitting it as a control message to be transmitted through an entity within a core network. For example, when selecting use of the control message, the IWF transmits a control message (T5 interface) including the trigger information to an MME/SGSN/MSC, and the MME/SGSN/MSC that received the control message transmits a NAS (Network Access Stratum) message including the trigger information to the UE. The UE that received the trigger transmits a trigger response to the MME/SGSN/MSC. The application data of the UE can be included in the trigger response as necessary.

Further, when a connection for the UE to perform data communication with the SCS (called a user plane, a PDP context, or a PDN connection) is not available yet, the UE performs appropriate procedures (attachment, connection establishment, connection activation, bearer establishment, bearer activation, bearer modification) as necessary after completion of processing for the device trigger. Each of these procedures is started by transmitting a control message such as a connection establishment request, a service request, or a bearer establishment request. The UE that received the trigger establishes a connection so that the UE can acquire an IP address and transmit, to the SCS, an IP packet including the application data to be passed to the AS. On the other hand, the SCS is required to pass, to an appropriate AS, data included in the IP packet received from the UE.

PRIOR ART DOCUMENTS

Non-Patent Documents
Non-Patent Document 1: "3rd Generation Partnership Project; Technical Specification Group Services and System Aspects; System Improvements for Machine-Type Communications", 3GPP TR 23.888, V1.6.1, February 2012.
Non-Patent Document 2: "3rd Generation Partnership Project; Technical Specification Group Services and System Aspects; Service requirements for machine-type communications", 3GPP TS 22.368, V11.4.0, March 2012.
Non-Patent Document 3: "3rd Generation Partnership Project; Technical Specification Group Services and System Aspects; Architecture Enhancements to facilitate communications with Packet Data Networks and Applications", 3GPP TS 23.682, V11.1.0. June 2012.
Non-Patent Document 4: "3rd Generation Partnership Project; Technical Specification Group Services and System Aspects; General Packet Radio Service (GPRS) enhancements for Evolved Universal Terrestrial Radio Access Network", 3GPP TS 23.401, V11.2.0, June 2012.

SUMMARY OF THE INVENTION

Since the SCS does not hold the IP address of the UE, the SCS transmits a control message instead of transmitting the IP packet. Therefore, the SCS that received the IP packet including the application data from the UE after transmitting the control message cannot identify the source UE because the SCS does not have information on the IP address set in the source address of an IP header. Even when an identifier of the UE is included in the application data within the IP packet, since the application data is created in a format interpreted by the AS, the SCS cannot interpret the format of the application data. Thus, since the SCS cannot authenticate the source UE when receiving the IP packet, the SCS passes the data to the AS without identifying the UE as the source of the IP packet, causing a security risk.

In order to solve the above problem, the present disclosure discloses a technique capable of reporting an IP address to an SCS using a control message before the start of transmission of an IP packet. For example, one aspect of the present disclosure is a communication terminal for performing communication with a predetermined communication device through a network, including: a control message receiving unit for receiving, from the network, a control message generated based on a trigger request message transmitted from the predetermined communication device for requesting the transmission of the control message to the communication terminal; a determining unit for determining whether to perform the communication with the predetermined communication device using an IP packet; a connection management unit for acquiring an IP address allocated to an IP connection used in the communication with the predetermined communication device when determining to perform the communication using the IP packet at the time of receiving the control message at the control message receiving unit; and a response message transmitting unit for transmitting a response message to the control message to the network, where the response message includes the IP address acquired by the connection management unit. According to the above configuration, for example, the effect of being able to include the IP address of a UE in a trigger response as a control message and report it to an SCS before the start of communication with the SCS can be realized.

In addition to the above communication terminal, the aspect of the present disclosure may also be realized by a communication system, a computer program, or a combination thereof.

Note that the effects and advantages of the present disclosure are not limited to those mentioned above. Further effects and advantages will become apparent from the disclosed contents of the specification and the drawings. The further effects and advantages mentioned above may be provided individually by various embodiments and features disclosed in the specification and the drawings, and all the effects and advantages do not necessarily need to be provided.

According to one aspect of the present disclosure, for example, the effect of being able to include the IP address of a UE in a trigger response as a control message and report it to an SCS before the start of communication with the SCS can be realized.

DESCRIPTION OF EMBODIMENTS

First and second embodiments of the present disclosure will be described below with reference to the accompanying drawings. In the first embodiment of the present disclosure, a method of determining whether to report an IP address to an SCS based on application data to be transmitted to an AS from a UE that received a device trigger will be described. In the second embodiment of the present disclosure, a method of determining whether to report the IP address to the SCS based on application data included in a trigger payload of the device trigger will be described.

First Embodiment

Figure 1:
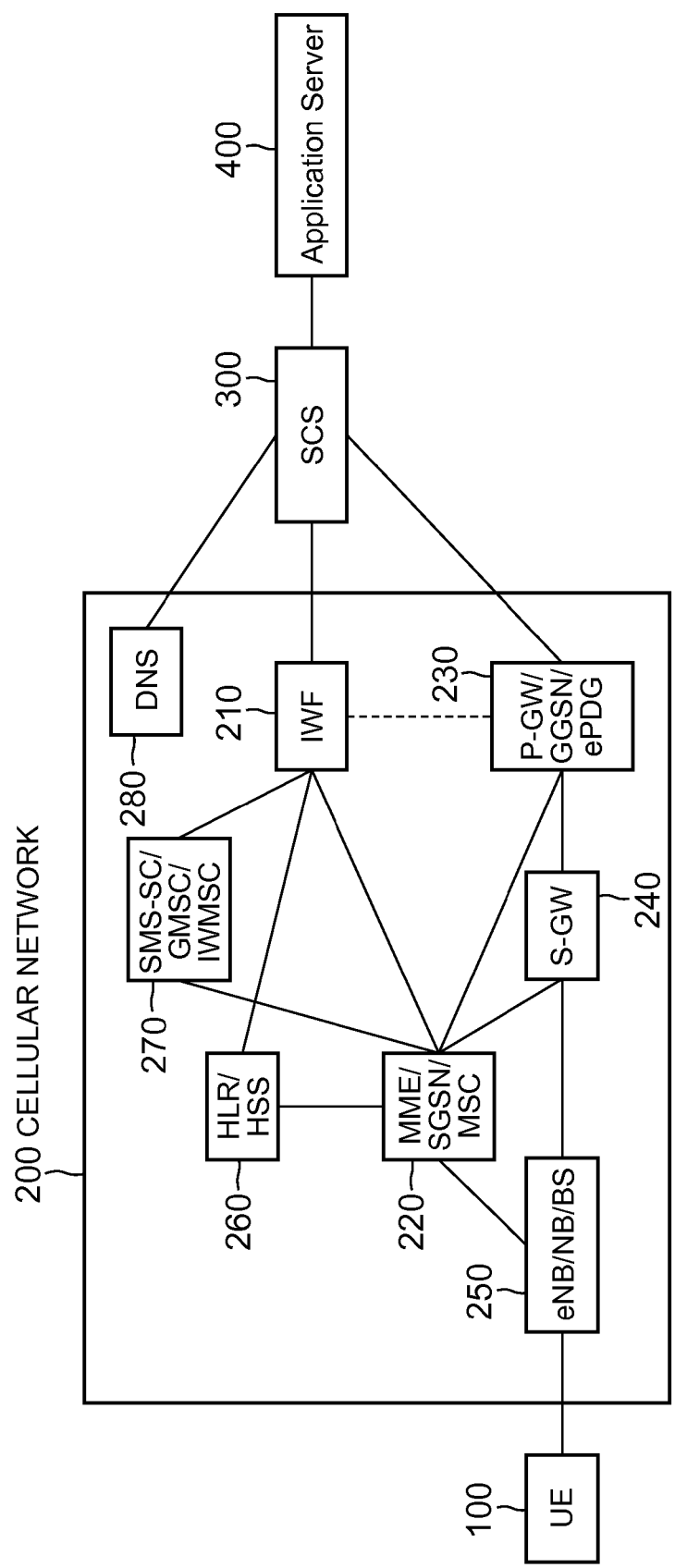
FIG. 1 is a diagram showing an example of a network configuration in a first embodiment of the present disclosure.

First, the first embodiment of the present disclosure will be described. FIG. 1 is a diagram showing an example of a network configuration in the first embodiment of the present disclosure. Illustrated in FIG. 1 are a UE 100 as a cellular communication terminal, a cellular network (called a core network or a 3GPP network as well, which may be simply referred to as a network below) 200 to which the UE 100 attaches, an SCS 300 for transmitting a trigger request addressed to the UE 100, and an application server 400 for performing data communication with the UE 100.

Also illustrated in FIG. 1 as components of the cellular network 200 are an IWF 210 for connecting the cellular network 200 with the SCS 300, an MME/SGSN/MSC (Mobility Management Entity/Serving GPRS Support Node/Mobile Switching Center) 220 for performing the management of position information (location) on the UE 100 and communication control of the UE 100 (line switch control or packet exchange control), a P-GW/GGSN/ePDG (Packet Data Network Gateway/Gateway GPRS Support Node/evolved Packet Data Gateway) 230 for performing the management of data communication connections of the UE 100, data transfer to foreign networks, user authentication, QoS control, and the like, an S-GW (Serving Gateway) 240 for performing the management of connections between a base station to which the UE 100 attaches and an entity (e.g., P-GW) within the cellular network 200 and the transfer of user data, an eNB/NB/BS 250 (evolved Node B/Node B/Base Station) functioning as a base station for providing the UE 100 with a point of attachment to the cellular network 200, an HSS/HLR (Home Subscriber Server/Home Location Register) 260 for managing user subscription data, an SMS-SC (Short Message Service-Service Center or GMSC/IWMSC) 270 serving to transmit SMS to the UE 100, and a DNS 280 for holding a correspondence between the ID of the IWF 210 and an IP address.

Note that an example of the network configuration for implementing functions specified in the 3GPP is shown in FIG. 1, but the network configuration to which the present disclosure is applied is not limited to that shown in FIG. 1. In the following description, the MME/SGSN/MSC 220 shown in FIG. 1 may be referred to as an MME 220 and the P-GW/GGSN/ePDG 230 shown in FIG. 1 may be referred to as a P-GW 230 to clarify the technical idea according to the present disclosure.

If the SCS 300 does not hold the IP address of the UE 100 when acquiring application data from the AS 400, the SCS 300 will transmit, to the IWF 210, a transmission request for a device trigger (control message) addressed to the UE 100.

On the other hand, when receiving a trigger request from the SCS 300, the IWF 210 transmits trigger information including data to the UE 100 through the network 200. As the method of transmitting the trigger information, there is more than one method, including a method of using a control message (C-plane (control plane)) such as an SMS message, a CBS message, or a message addressed to the MME 220. The IWF 210 selects any method based on UE information and the congestion situation of the network.

Multiple entities that constitute a 3GPP radio network and a core network exist in the cellular network 200, and the MME 220 and the SMS-SC 270 serve to receive a request from the IWF 210 and transmit, to the UE 100, a device trigger as an SMS message including the trigger information. When a conventional SMS is used as the device trigger, the IWF 210 requests the SMS-SC 270 to transmit the device trigger, and the SMS-SC 270 requests the MME 220 to transmit the SMS. The MME 220 transmits, to the UE 100, the SMS received from the SMS-SC 270. For example, the MME 220 transmits the SMS to the UE 100 by including the SMS in a NAS message container of Downlink NAS Transport. On the other hand, in the case of the MSC 220, an SMS dedicated message is transmitted to the UE 100.

In order to report the device trigger to the MME 220, the IWF 210 can also transmit the trigger request using an interface connecting to the MME 220. In this case, in response to receiving the trigger request from the IWF 210, the MME 220 may transmit trigger information included in the trigger request as a device trigger by including it in the NAS message container of the Downlink NAS Transport, or transmit the trigger information as the device trigger by including it in any other NAS message. When the trigger information is put in the NAS message container, the trigger information may be converted to an SMS format.

On the other hand, when the IWF 210 has an interface connecting to the P-GW 230, the IWF 210 can request the P-GW 230 to transmit an IP packet including the trigger information to the UE 100. However, the IWF 210 of the present disclosure does not use this method.

For the sake of simplicity, a description will be made below by taking, as an example, a case where the SCS 300 transmits a transmission request (trigger request) for a device trigger to the IWF 210 and the IWF 210 that received the trigger request uses the interface connecting to the MME 220 as transmission means for trigger information to select means for transmitting the trigger information. In this case, the MME 220 transmits a control message (NAS message) including the trigger information received from the IWF 210 to the UE 100 as a device trigger. Note that the application server 400 performing application layer communication with the UE 100 may operate on the SCS 300 or on another node connected to the SCS 300. Further, the SCS 300 may be located within the cellular network 200.

When receiving the device trigger, the UE 100 transmits a control message as necessary to perform processing for establishing or modifying a connection with the cellular network 200. For example, control messages to be transmitted at this time include ATTACH REQUEST, DETACH REQUEST, SERVICE REQUEST, PDN CONNECTIVITY REQUEST, ACTIVATE DEDICATED EPS BEARER CONTEXT REQUEST, BEARER RESOURCE ALLOCATION REQUEST, and BEARER RESOURCE MODIFICATION REQUEST. Based on the kind of application as the object of the device trigger, the state of the application, the connection situation of the UE 100 at the time of receiving the device trigger, and the like, it is determined which control message should be transmitted.

For example, when the application that received the device trigger has not established (made available) a connection (PDN connection, default bearer, dedicated bearer) necessary for data communication with the SCS 300, a control message (PDN connection establishment request, dedicated bearer establishment request (bearer establishment request, bearer modification request)) is transmitted to establish the necessary connection. Note that an existing bearer may be updated, instead of establishing a new dedicated bearer, to modify it into a bearer that meets the application request. When the connection is established, the UE 100 can acquire an IP address and transmit a data packet (application message) to the SCS 300 through the established connection.

The PDN connection is a data communication connection established between the UE 100 and the P-GW 230, and a single IP address used by the UE 100 is allocated. On the other hand, the bearer (also called EPS bearer) is a connection established in association with the PDN connection, and there are two kinds: a GBR (Guaranteed Bit Rate) bearer having a guaranteed bit rate and a best effort Non-GBR bearer. When a PDN connection is established for a specific APN (Access Point Name, PDN (Packet Data Network) identifier), a default bearer (Non-GBR) is also established simultaneously. After the PDN connection and the default bearer are established, the UE 100 establishes any dedicated bearer according to the request from the application or the like. Note that a bearer in EPS (Evolved Packet System) corresponds to a PDP (Packet Data Protocol) context in UMTS (Universal Mobile Telecommunications System).

In the first embodiment of the present disclosure, the description is made on the assumption of the application server 400 as a communication partner of the UE 100. However, the communication partner of the UE 100 is not limited to the application server 400, and any other UE may be the communication partner of the UE 100. Further, in addition to LTE/SAE/EPS (Long Term Evolution/System Architecture Evolution/Evolved Packet System), UMTS, GPRS (General Packet Radio Service), and GSM (Global System for Mobile Communications), WiMAX (Worldwide interoperability for Microwave Access) (registered trademark), mobile WiMAX, WLAN (Wireless Local Access Network), and the like may be used as the cellular network 200 shown in FIG. 1. In such a case, the names of various entities conform to the specifications.

Figure 2:
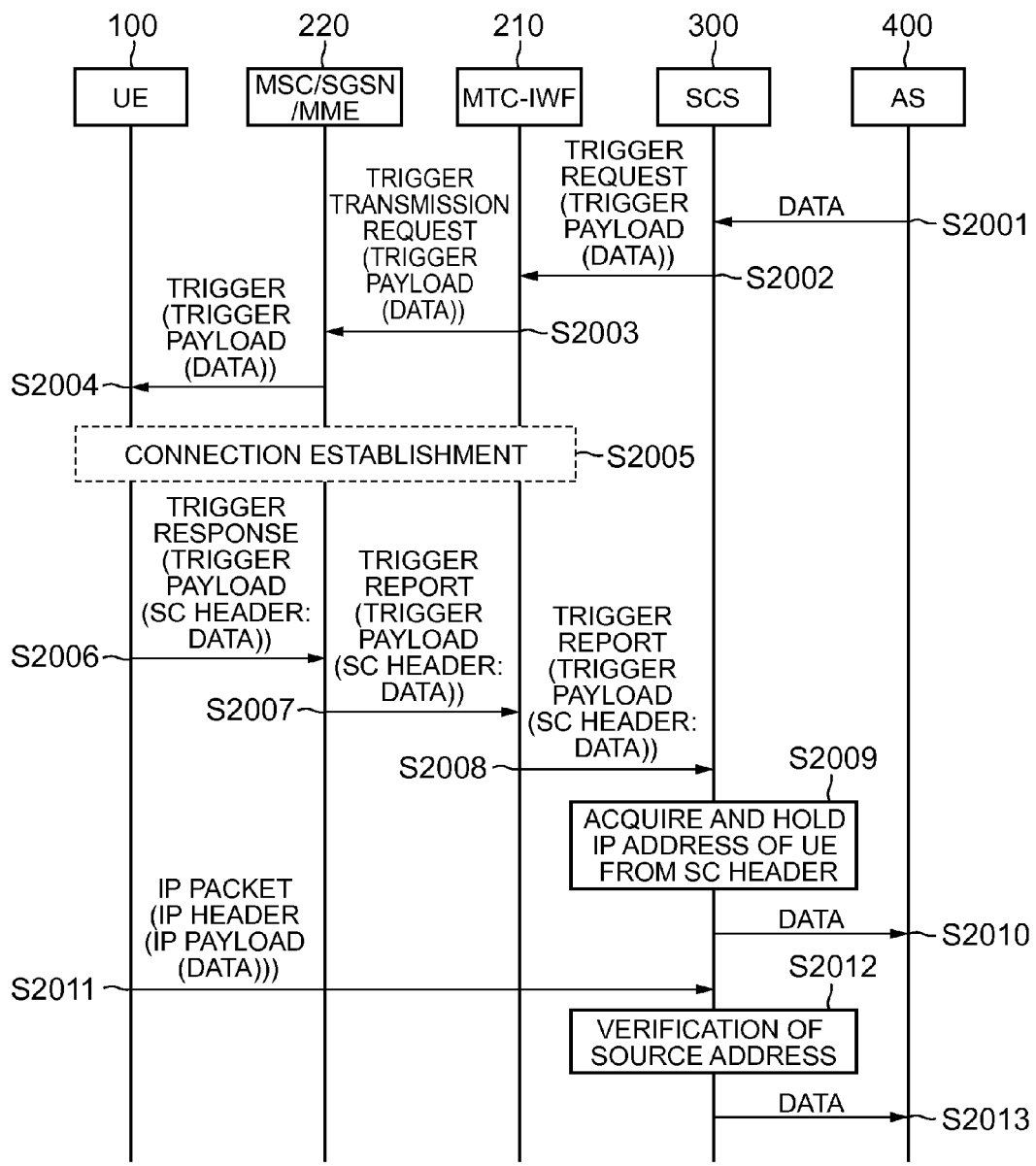
FIG. 2 is a sequence chart showing a first example of operation of an SCS 300 and a UE 100 in the first embodiment of the present disclosure.

FIG. 2 is a sequence chart showing a first example of operation of the SCS 300 and the UE 100 in the first embodiment of the present disclosure. The SCS 300 transmits a trigger request to the IWF 210 to transmit data acquired from the AS 400 to the UE 100. Note that the SCS 300 may make an inquiry to the DNS 280 about the IP address of the IWF 210 as the source of the trigger request. When the IP address of the IWF 210 is already held, the inquiry to the DNS 280 is omitted. The SCS 300 transmits, to the IWF 210, a trigger request including the ID (External Identifier or MSISDN (Mobile Subscriber ISDN Number)) of the UE 100, the ID of the SCS 300, and the like (step S2002).

Further, the SCS 300 includes information to be reported to the application of the UE 100 in a payload field (hereinafter called a trigger payload) of the trigger request. The information to be reported to the application of the UE 100 is data acquired from the AS 400 or data generated by the SCS 300. When the size of data acquired from the AS 400 is smaller than the size of the trigger payload, the SCS 300 may include all pieces of data in the trigger payload. On the other hand, when the size of data acquired from the AS 400 is larger than the size of the trigger payload, the SCS 300 may include a part of data in the trigger payload with the residual data transmitted as an IP packet, or transmit all pieces of data as an IP packet.

Note that data in the trigger payload is transparent to entities (IWF 210, MME 220, and the like) within the core network and reported intact to the UE 100 as information inserted by the SCS 300. The ID of the UE 100 included in the trigger request indicates the destination (target) of the control message transmitted by the IWF 210 and the MME 220. The IWF 210 that received the trigger request confirms the SCS 300 as the source of the trigger request, confirms registration information (subscription information) on the UE 100 as the trigger destination, and checks on the load control of the trigger request. The confirmation of the SCS 300 is to check whether to accept the trigger request received from the SCS 300, which is, for example, to confirm whether it is the SCS whose transmission of the device trigger is authorized, whether the SCS 300 is not an SCS whose transmission of the trigger request is restricted, or whether there is no format error in the message of the trigger request received.

Checking on the load control of the trigger request is to check on the network bandwidth or the traffic load of transmitting and receiving the trigger request, or the contract detail, which is, for example, to confirm the load situation such as to confirm whether the number of transmissions (Submission Quota) of the trigger request transmitted by the SCS 300 does not exceed a prescribed value, whether the transmission frequency (Submission Rate) of the trigger request does not exceed a prescribed value, or whether the processing load on the IWF is not overloaded. For example, when the transmission frequency of the trigger request received from the SCS 300 exceeds a prescribed value (the upper limit determined by the contract, or the like), it is determined that there is a problem with the load control, and the trigger request is refused.

Checking on the registration information on the UE 100 is to make an inquiry to the HSS (Home Subscription Server) about information on the UE 100 and confirm whether the device trigger can be transmitted to the UE. For example, when the UE is not qualified to receive the device trigger as a result of confirming the UE information, or when the UE is not in the state of being able to receive the device trigger, it is determined that there is a problem with the UE information, and the trigger request is refused. When there is no problem with the results of these checks, the IWF 210 transmits a request for the device trigger to the MME 220 (step S2003). The MME 220 that received this request transmits a control message (device trigger) including trigger information to the UE 100 (step S2004).

Figure 3:
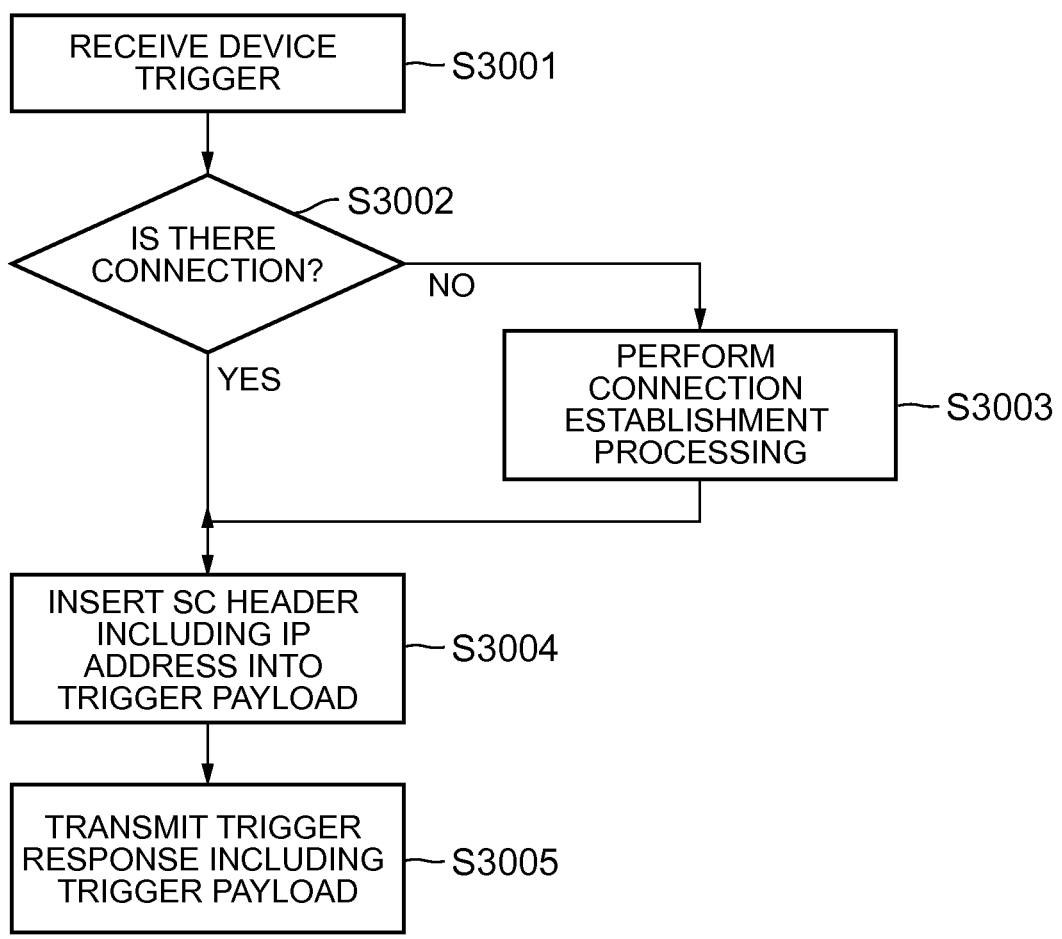
FIG. 3 is a sequence chart showing an example of processing performed by the UE 100 that received a device trigger in the first embodiment of the present disclosure.

FIG. 3 is a flowchart showing an example of processing (steps S2004 to S2006 in FIG. 2) performed by the UE 100 that received the device trigger. The UE 100 that received the device trigger (S3001) confirms whether there is a connection for data communication with the AS 400 (S3002). When there is no connection, processing for establishing a connection is performed (S3003). In this case, the UE 100 does not transmit a trigger response to the device trigger until a connection is established so that an IP address can be acquired. Then, the IP address allocated to the connection is included in a predetermined field (trigger payload) of the trigger response (S3004) and transmitted to the MME 220 (S3005).

The connection for data communication with the AS 400 is a connection for attaching to a PDN (Packet Data Network) in which the AS 400 exists. In other words, the connection is a connection for communicating with the SCS 300 on a PDN identified by APN (Access Point Name) derived from data included in the trigger payload of the device trigger received or by APN corresponding to the application as the object of the device trigger. The UE 100 includes the IP address in the format the SCS 300 can interpret and inserts it into the trigger payload so that the SCS 300 can take the IP address properly from the trigger report received from the IWF 210.

For example, a header (hereinafter called an SC (Service Capability) header) built in the format the SCS 300 can interpret is created, and the IP address is included in the header and located in a predetermined position (at the beginning or end) of the trigger payload. If there is data to be reported from the UE 100 to the AS 400, the SC header will be prepended to the data and inserted into the trigger payload.

Figure 5:
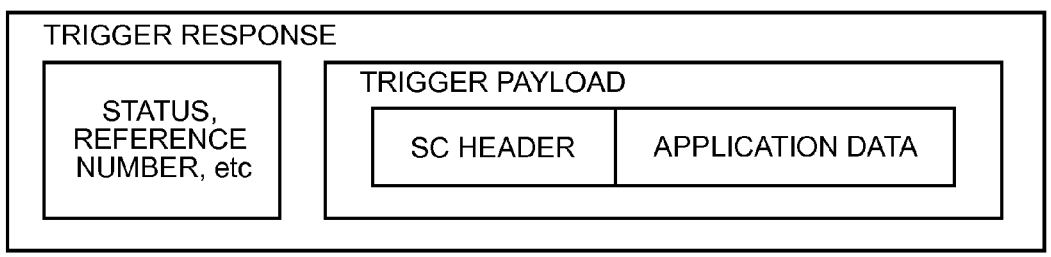
FIG. 5 is a diagram showing an example of the message structure of a trigger response with an SC header added in the first embodiment of the present disclosure.

FIG. 5 is a diagram showing an example of the message structure of the trigger response with the SC header added thereto. The MME 220 that received the trigger response transmitted from the UE 100 includes, in the trigger report, the trigger payload included in the trigger response, and transmits the trigger report to the IWF 210, and the IWF 210 transmits the trigger report to the SCS 300 (steps S2007 and S2008). Note that step S2006 in FIG. 2 is called the trigger response and steps S2007 and S2008 are called the trigger report to distinguish therebetween, but the message may be any message as long as the message can report, to the SCS 300, the trigger payload (SC header and data) inserted by the UE 100.

Figure 4:
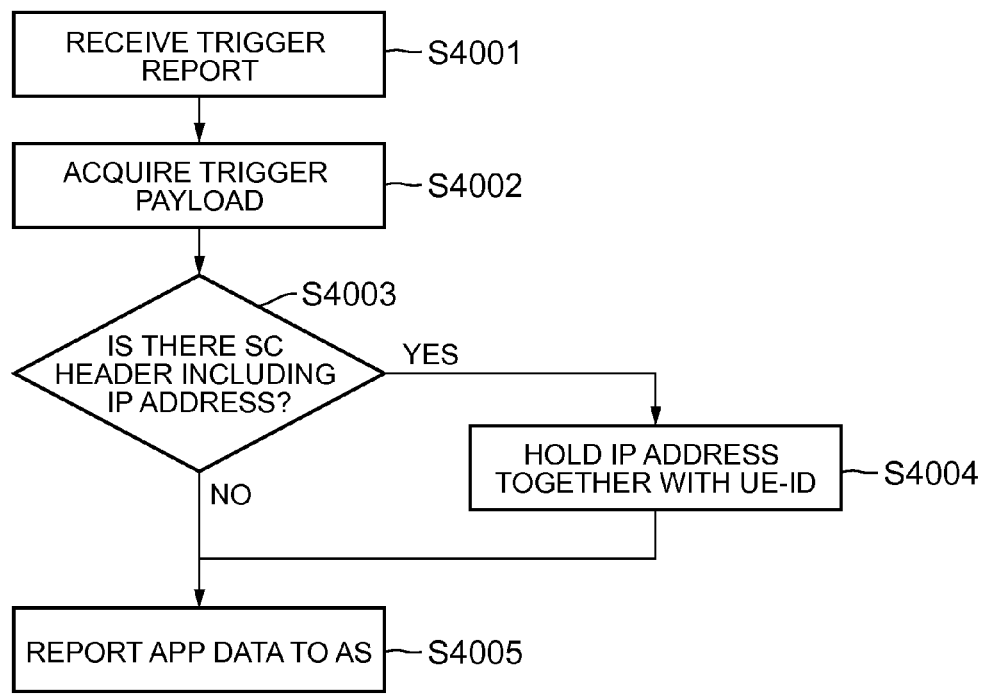
FIG. 4 is a sequence chart showing an example of processing performed by the SCS 300 that received a trigger report in the first embodiment of the present disclosure.

FIG. 4 is a flowchart showing an example of processing (steps S2008 to S2010 in FIG. 2) performed by the SCS 300 that received the trigger report. The SCS 300 that received the trigger report (S4001) acquires information included in the trigger payload of the trigger report (S4002) to confirm whether the SC header including the IP address is included in the trigger payload (S4003). When there is the SC header, The SCS 300 acquires the IP address included in the SC header and holds the IP address in association with the ID of the UE (S4004). Then, the SCS 300 reports a remaining portion after removing the SC header to the AS as data (S4005). Since messages exchanged between the IWF 210 and the SCS 300 are messages (control messages) that meet security requirements such as confidentiality and integrity. The SCS 300 can trust the IP address included in the trigger report received from the IWF 210 to be the IP address of the UE 100. When the UE 100 reports the IP address to the SCS 300 using the user plane, since there is a need to use a security mechanism such as IPSec in order to ensure security, the processing load on the UE 100 and the SCS 300 increases, but the use of a control message to report the IP address can reduce the processing load.

In step S4003, when there is no SC header including the IP address, all pieces of information in the trigger payload are reported to the AS as data (S4005). On the other hand, after the IP address of the UE 100 is acquired from the SC header, remaining information after removing the SC header is reported to the AS as data (S4005). In S4003, when the SC header exists but no IP address is included, a remaining portion after removing the SC header is reported to the AS as data as well. Returning to FIG. 2, the UE 100 transmits an IP packet including data to the SCS 300 (S2011).

The SCS 300 that received the IP packet confirms the source address of the IP packet (S2012), and when a source IP address is held, the SCS 300 reports data included in the IP payload to the AS 400 (S2013). On the other hand, when no IP address corresponding to the source address is held, since the source UE cannot be identified, the SCS 300 discards the IP packet. The case of holding the source IP address is a case where the source IP address matches the IP address reported on the trigger report in step S2009 and a UE corresponding to the IF address can be identified. When headers to be processed by the SCS 300 are added to the data in the IP payload, a remaining portion of the data after removing these headers is reported to the AS 400.

Figure 6:
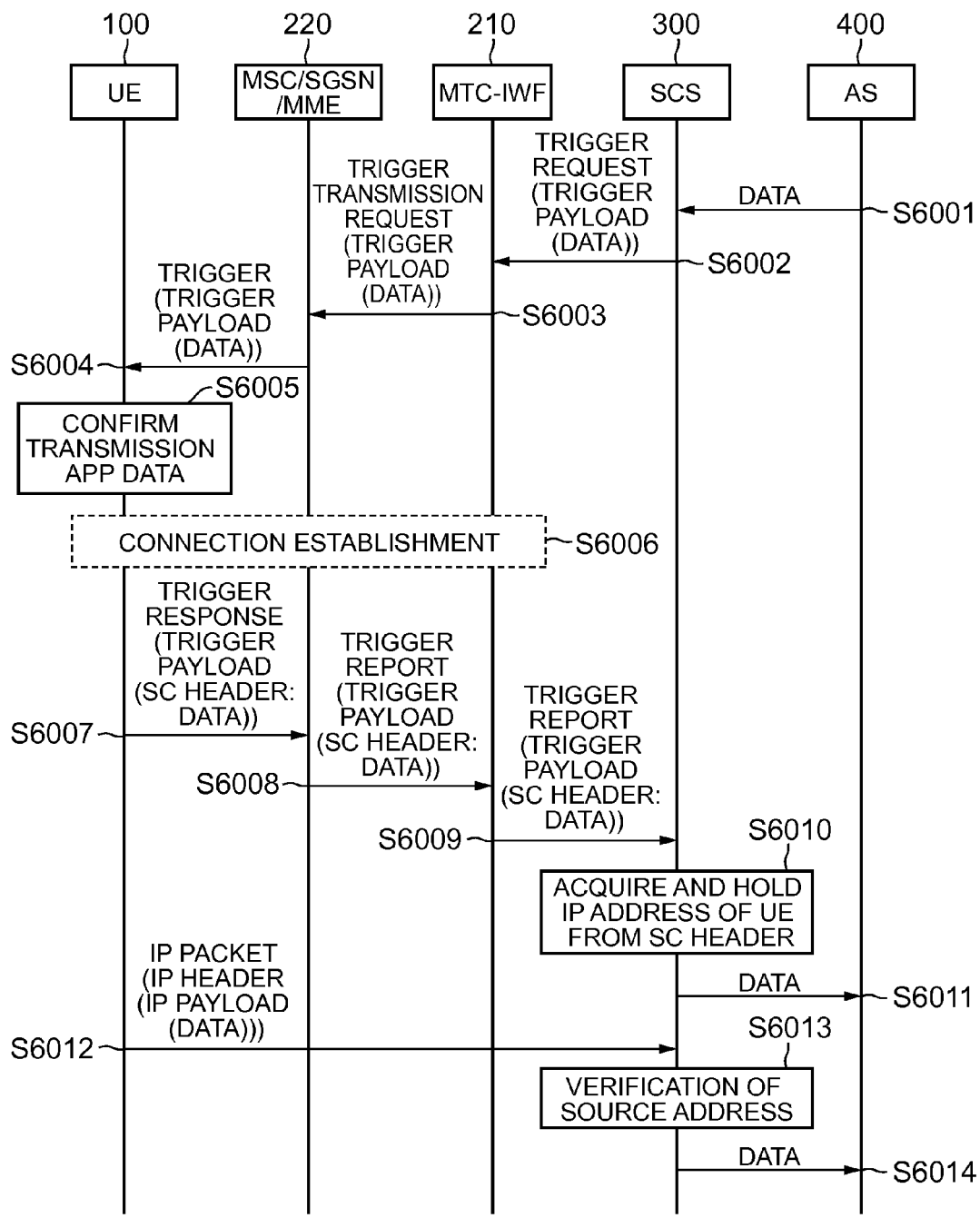
FIG. 6 is a sequence chart showing a second example of operation of the SCS 300 and the UE 100 in the first embodiment of the present disclosure.

FIG. 6 is a sequence chart showing a second example of operation of the SCS 300 and UE 100 in the first embodiment of the present disclosure. A difference from the first example described with reference to FIG. 2 is that, before the UE 100 that received the trigger confirms the presence or absence of a connection in step S6006, the UE 100 confirms application data to be transmitted to the AS 400 in step S6005. Since the other steps are the same as those in FIG. 2, redundant description will be omitted.

Figure 7:
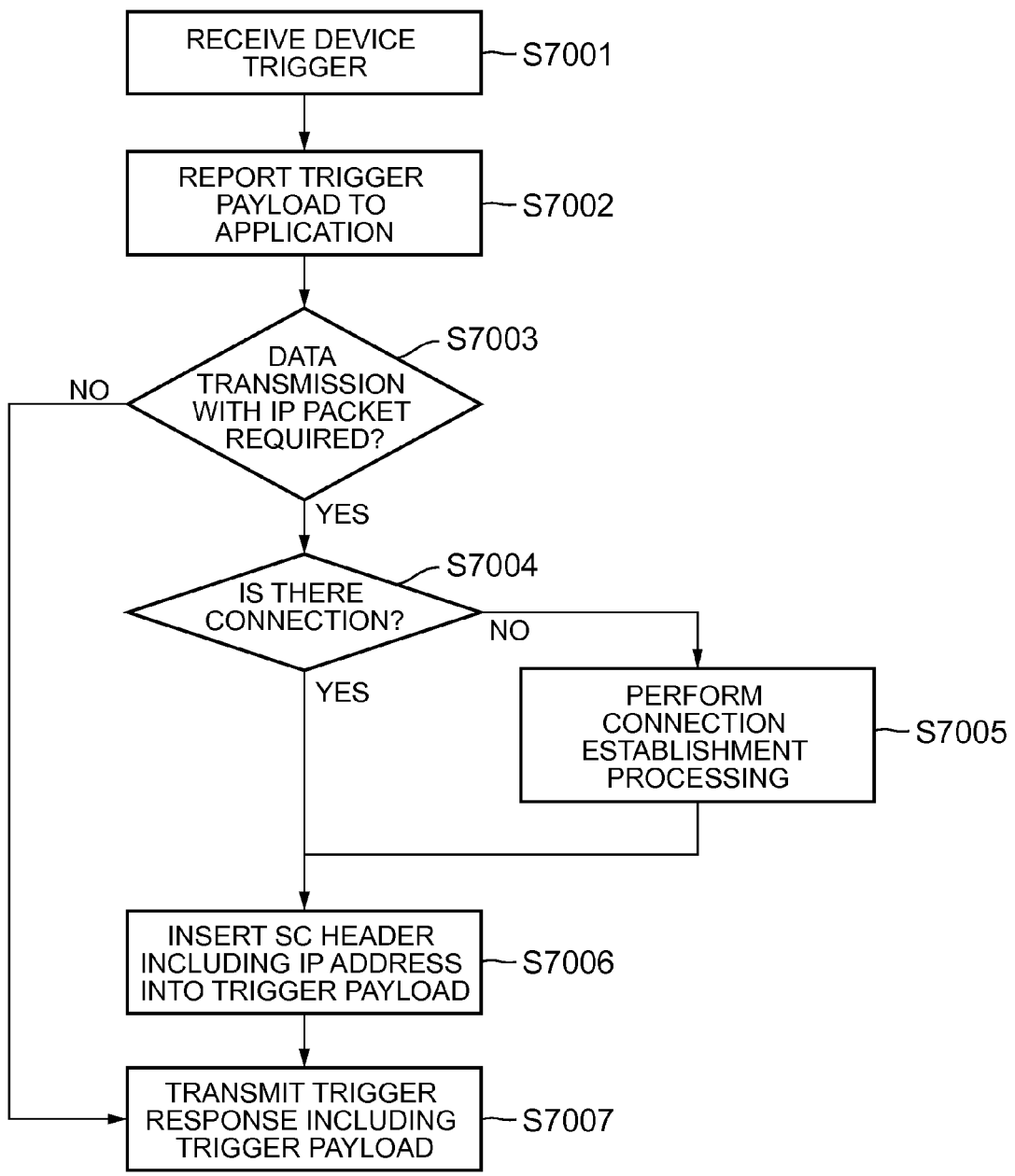
FIG. 7 is a flowchart showing an example of processing performed by the UE 100 that received the device trigger in the first embodiment of the present disclosure.

FIG. 7 is a flowchart showing an example of processing (steps S6004 to S6007) performed by the UE 100 that received the device trigger. A difference from the operation of the UE 100 in the first example described with reference to FIG. 3 is that data to be reported from the application of the UE 100 to the AS 400 is checked in step S7002 as to whether the data needs to be transmitted with an IF packet. The UE 100 that received the device trigger (S7001) reports the trigger payload included in the device trigger to the application (S7002). If the application is not started, data will be reported after the application as the object of the device trigger is started. Note that the NAS layer of the UE 100 receives the device trigger and reports the trigger payload to an appropriate application or a layer (hereinafter, an SC (Service Capability) layer) for controlling the application. The SC layer serves to perform processing on the trigger payload and report data included in the trigger payload to the appropriate application as necessary.

For example, a target application is identified (started) from the application ID included in the SC header, and a remaining portion of information after removing the SC header is reported to the application as data. In other words, the NAS layer of the UE 100 waits until the results of processing the trigger payload and data by the SC layer and the application are reported before transmitting a trigger response to the device trigger received. These functions of the SC layer may be provided by a layer placed between the NAS layer and the application layer, or provided as one application that operates at the application layer, or provided by the NAS layer.

As a result of processing the trigger payload, when there is application data to be transmitted to the AS 400, the data is confirmed as to whether the data needs to be transmitted using an IP packet (S7003). The case where the data needs to be transmitted with an IP packet is a case where the size of data is larger than the data size (the size of the trigger payload) to be included in the trigger response, or the like. Further, when it takes time to generate data to be transmitted to the AS 400 (when a given amount of time has elapsed after the trigger payload was reported to the SC layer or the application), the NAS layer may determine that data needs to be transmitted using an IP packet. The determination of whether data needs to be transmitted with an IP packet may be made by the NAS layer of the UE 100 alone. For example, based on identification information on the SCS 300 included in the device trigger or identification information on the AS 400 that generated data, it is confirmed whether data communication using an IP packet is required.

When the data needs to be transmitted with an IP packet, it is then confirmed whether there is a connection for data communication with the AS 400 (S7004). Since the operations after step S7004 are the same as the operations after step S3002 in FIG. 3, redundant description will be omitted. On the other hand, when there is no need to transmit, with an IP packet, data to be reported from the application of the UE 100 to the AS 400, a trigger response in which a trigger payload including only data is inserted is transmitted (S7007). Note that the UE 100 may insert, into the trigger payload, data to which an SC header without any IP address is added, and transmit a trigger response including the trigger payload.

Figure 8:
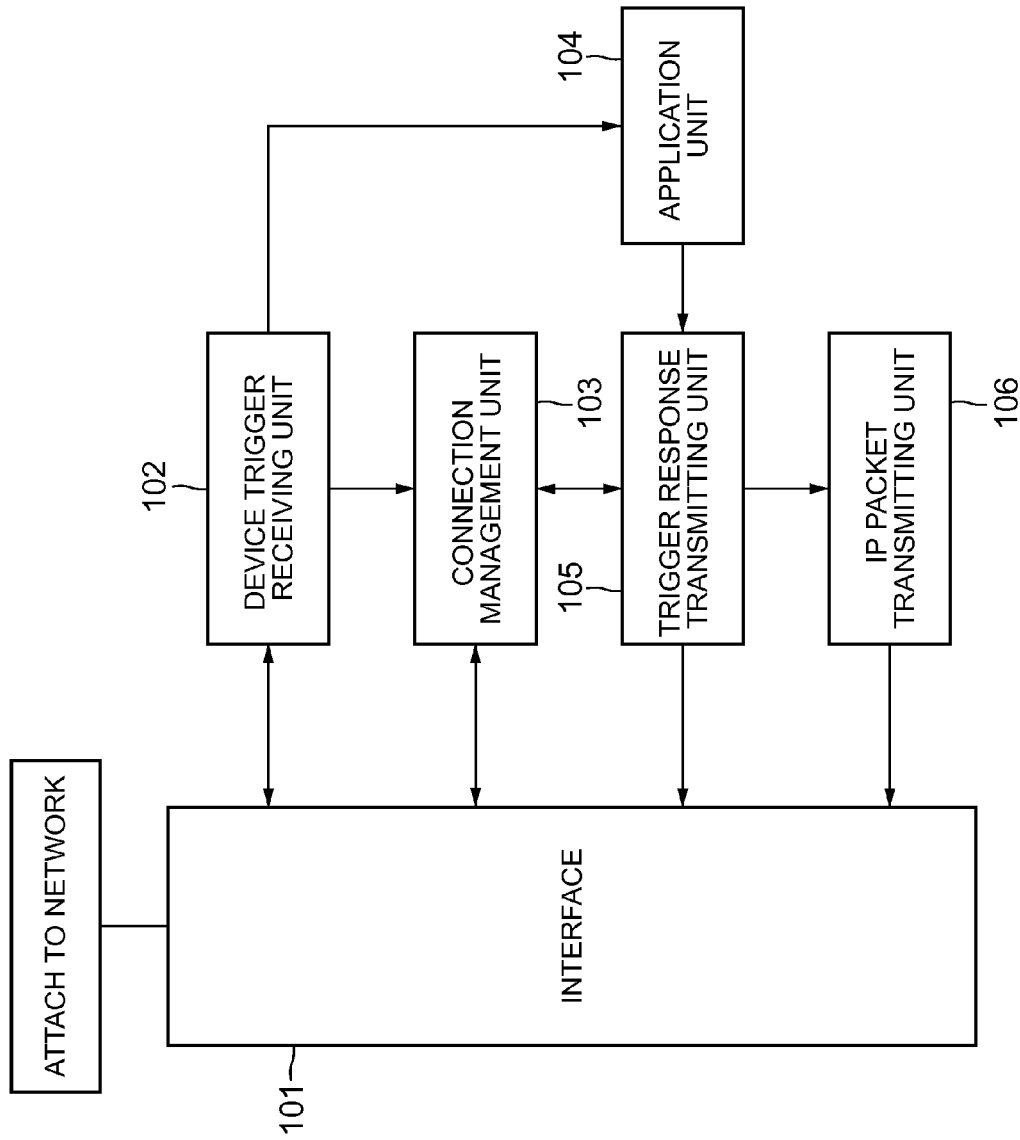
FIG. 8 is a block diagram showing an example of the configuration of the UE 100 in the first embodiment of the present disclosure.

Next, an example of the configuration of the UE 100 in the first embodiment of the present disclosure will be described. FIG. 8 is a block diagram showing an example of the configuration of the UE 100 in the first embodiment of the present disclosure. The UE 100 shown in FIG. 8 has an interface 101, a device trigger processing unit 102, a connection management unit 103, an application unit 104, a trigger response transmitting unit 105, and an IP packet transmitting unit 106.

The interface 101 has the function of enabling the UE 100 to attach to a network and transmit and receive control messages and IP packets. Hardware for modulating and demodulating information into an electrical signal to communicate with any other communication device (for example, a network node on a network or any other UE 100) is also included in the interface 101. The device trigger receiving unit 102 receives a device trigger and passes a trigger payload included in the device trigger to the application unit 104. The device trigger receiving unit 102 further instructs the connection management unit 103 to establish a connection.

The connection management unit 103 receives an instruction from the device trigger receiving unit 102 or the trigger response transmitting unit 105 to establish a connection. When a connection usable for communication with the AS 400 already exists, an IP address allocated to the connection is reported to the trigger response transmitting unit 105. Note that processing performed by the connection management unit 103 is not limited to the establishment of a new connection, and the processing also includes the modification of an established connection and the like. The application unit 104 checks on the trigger payload reported from the device trigger receiving unit 102, generates data to be transmitted to the AS 400, and reports the data to the trigger response transmitting unit 105. When the data reported from the application unit 104 needs to be transmitted with an IP packet, the trigger response transmitting unit 105 acquires an IP address from the connection management unit 103, and transmits a trigger response including the IP address. After transmitting the trigger response, the IP packet transmitting unit is instructed to transmit the data with an IP packet. The IP packet transmitting unit 106 transmits, to the SCS 300, the IP packet including the data received from the trigger response transmitting unit 105 and to be reported to the AS 400.

Figure 9:
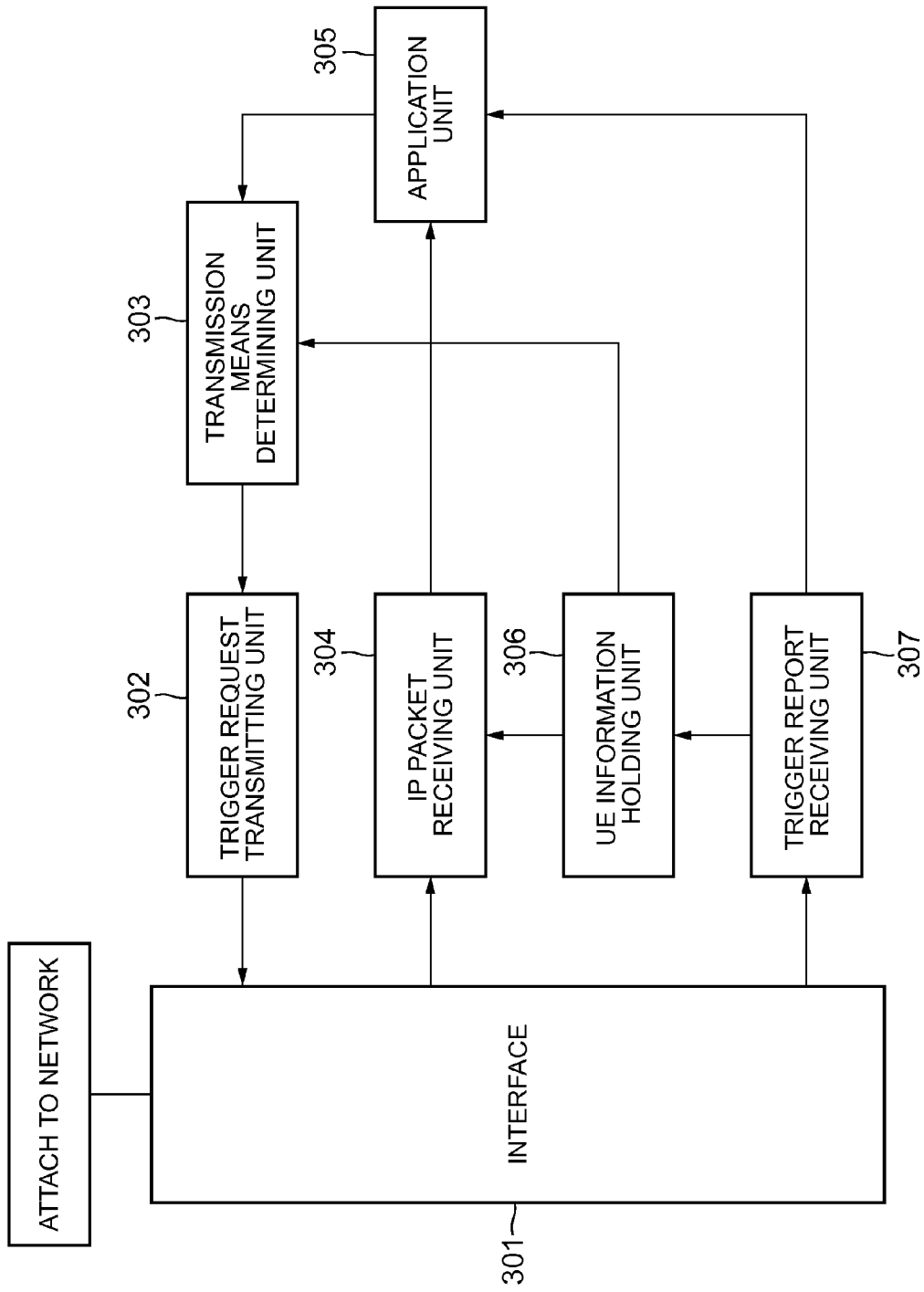
FIG. 9 is a block diagram showing an example of the configuration of the SCS 300 in the first embodiment of the present disclosure.

Next, an example of the configuration of the SCS 300 in the first embodiment of the present disclosure will be described. FIG. 9 is a block diagram showing an example of the configuration of the SCS 300 in the first embodiment of the present disclosure. The SCS 300 shown in FIG. 9 has an interface 400, a trigger request transmitting unit 302, a transmission means determining unit 303, an IP packet receiving unit 304, an application unit 305, a UE information holding unit 306, and a trigger response receiving unit 307.

The interface 101 has the function of enabling the UE 100 to attach to a network and transmit and receive control messages and IP packets. Hardware for modulating and demodulating information into an electrical signal to communicate with any other communication device (for example, a network node on a network or any other UE 100) is also included in the interface 101. The trigger request transmitting unit 302 receives an instruction from the transmission means determining unit 303 to transmit a trigger request to the IWF 210 in order to request the transmission of a device trigger to the UE 100. Data reported from the application unit 305 is included in the trigger payload of the trigger request. The transmission means determining unit 303 selects means for transmitting, to the UE 100, the data reported from the application unit 305.

When the trigger request is selected as the transmission means, the trigger request transmitting unit 302 is instructed to transmit the trigger request. The IP packet receiving unit 304 refers to a correspondence between the ID of the UE and the IP address held in the UE information holding unit 306 to identify a UE having the source address of an IP packet received. When the source UE can be identified, data included in the IP packet is reported to the application unit 305. The application unit 305 receives data from the AS 400 and instructs the transmission means determining unit 303 to transmit it to the UE 100.

Data received from the IP packet receiving unit 304 and the trigger response receiving unit 307 are also reported to the AS 400. Note that the application unit 305 may include the functions of the AS 400. The UE information holding unit 306 holds a correspondence between the ID of the UE and the IP address. The trigger report receiving unit 307 receives a trigger report, acquires the IP address set in the SC header within the trigger payload included in the trigger report, and instructs the UE information holding unit 306 to hold the IP address. A remaining portion of the trigger payload after removing the SC header is reported to the application unit 305.

As described above, according to the first embodiment of the present disclosure, since the UE 100 can establish a connection for communicating with the AS 400 before returning a response to the device trigger received, and include the allocated IP address in the trigger response in a format the SCS 300 can interpret, the SCS 300 can hold the IP address of the UE 100 included in a trusted trigger report message received from the core network 200. Further, since the SCS 300 can know the IP address of the UE 100 before receiving an IP packet from the UE 100, the SCS 300 reports data to the AS 400 when the SCS 300 can confirm the source address of the IP packet received. Thus, since the IP address of the UE 100 is reported to the SCS 300 through a trusted message, the SCS 300 can receive only an IP packet sent from the trusted IP address and report data included in the IP packet to the AS 400.

Second Embodiment

Next, a method of reporting an IP address to the SCS based on application data included in the application payload of the device trigger in the second embodiment of the present disclosure will be described.

Figure 10:
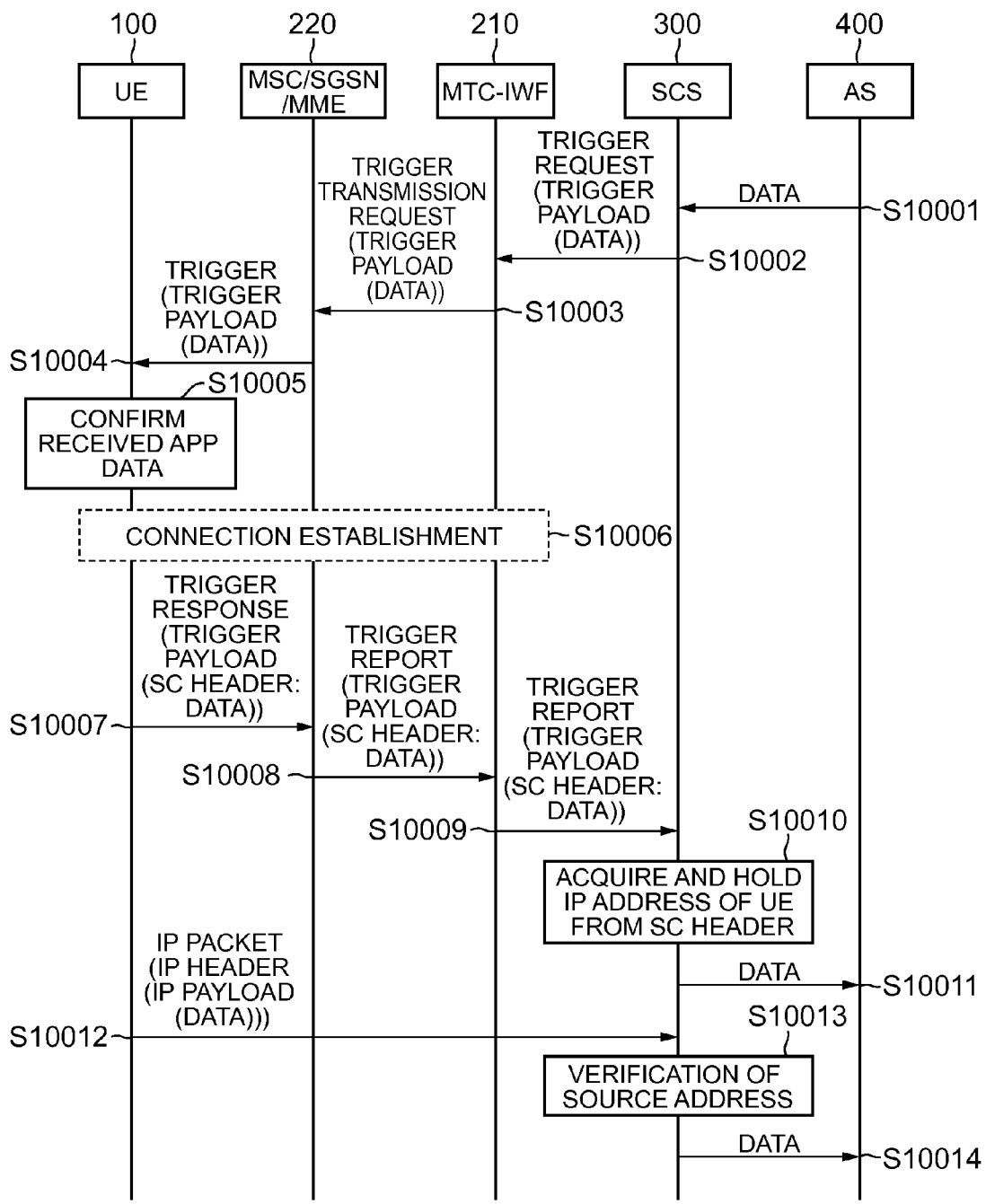
FIG. 10 is a sequence chart showing an example of operation of the SCS 300 and the UE 100 in a second embodiment of the present disclosure.
Figure 11:
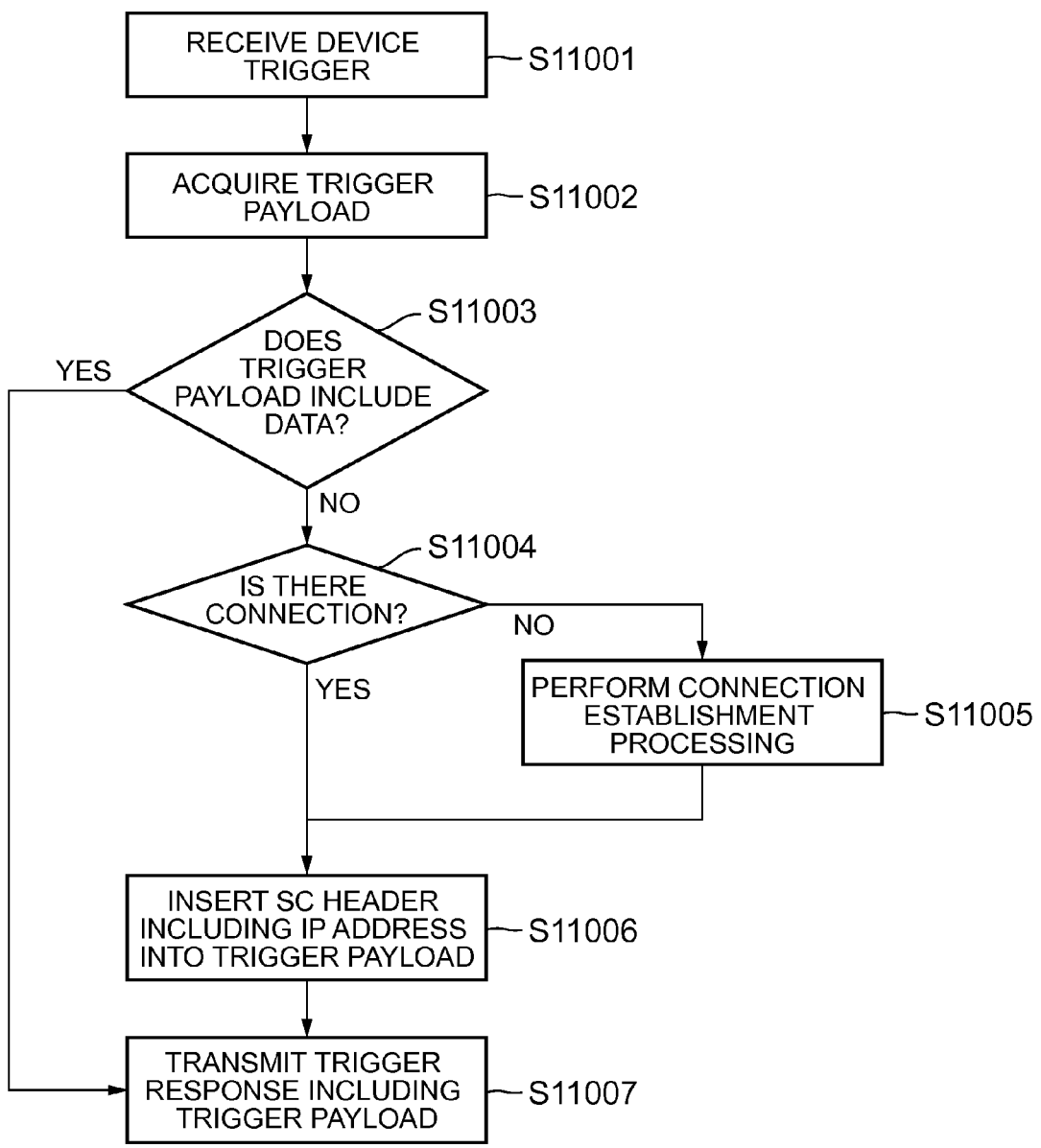
FIG. 11 is a flowchart showing a first example of processing performed by the UE 100 that received the device trigger.

FIG. 10 is a sequence chart showing a first example of operation of the SCS 300 and the UE 100 in the second embodiment of the present disclosure. A difference from the first example in the first embodiment of the present disclosure described with reference to FIG. 2 is that the UE 100 that received the trigger confirms application data received in step S10005. Since the other steps are the same as those in FIG. 2, redundant description will be omitted. FIG. 11 is a flowchart showing the first example of processing (steps S10004 to S10007) performed by the UE 100 that received the device trigger. A difference from the operation of the UE 100 in the first embodiment of the present disclosure described with reference to FIG. 3 is that it is confirmed in step S11003 whether data is included in the trigger payload.

The UE 100 that received the device trigger (S11001) acquires the trigger payload included in the device trigger (S11002). The UE 100 confirms whether data is included in the trigger payload (S11003), and when no data is included, the UE 100 takes it that the SCS 300 waits for an IP address to be reported from the UE 100 to transmit data reported from the AS 400 with an IF packet. Therefore, after processing step S11004 and step S11005, the UE 100 eventually transmits a trigger response by inserting the SC header including the IP address into the trigger payload (S11006, S11007). Since processing after step S11004 is the same as that in FIG. 2, redundant description will be omitted.

On the other hand, when data is included in the trigger payload, the UE 100 takes it that the SCS 300 has included the data reported from the AS 400 in the trigger payload, and that the SCS 300 might not need to transmit, with an IF packet, the data reported from the AS 400. Therefore, the UE 100 transmits a trigger response with no IP address included (S11007). Note that the UE 100 may transmit a trigger response into which a trigger payload including only data is inserted, or a trigger response into which a trigger payload including data is inserted, where an SC header without any IP address is added to the data. In step S11003, when the SC header is included in the trigger payload, it is confirmed whether a remaining portion after removing the SC header includes data. When data is included, the procedure proceeds to step S11007, while when no data is included, the procedure proceeds to step S11004. The method of determining whether to report the IP address based on the SC header will be described later.

Returning to FIG. 10, the UE 100 transmits an IP packet including data to the SCS 300 (S10012). The SCS 300 that received the IP packet confirms the source address of the IF packet (S10013). When the source UE can be identified, the SCS 300 reports the data to the AS 400 (S10014). On the other hand, when the UE corresponding to the source address cannot be identified, the SCS 300 discards the IP packet without reporting the data to the AS 400.

Figure 12:
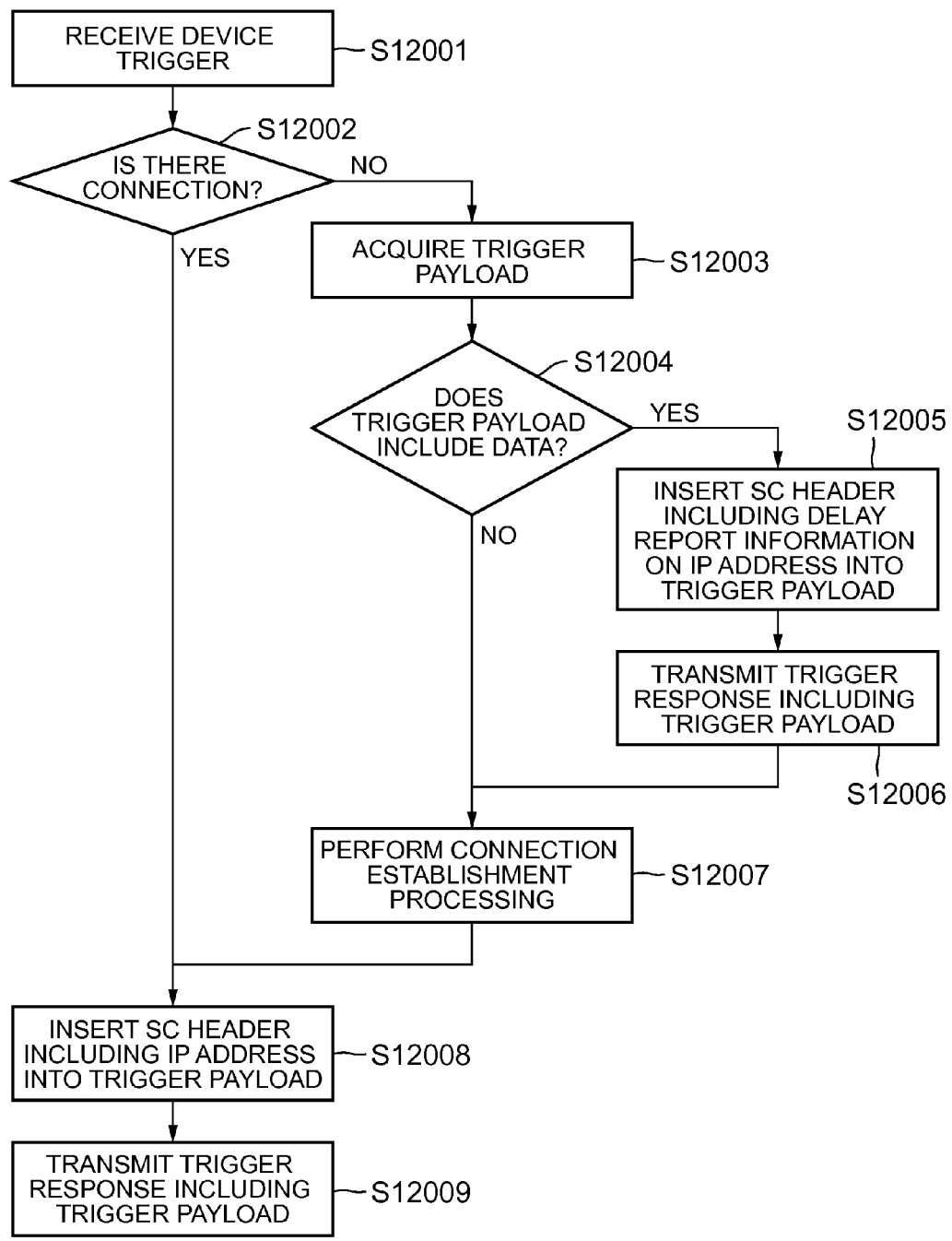
FIG. 12 is a flowchart showing a second example of processing performed by the UE 100 that received the device trigger.

FIG. 12 is a flowchart showing a second example of processing (steps S10004 to S10007) performed by the UE 100 that received the device trigger. A difference from the operation of the UE 100 in the first example of the second embodiment of the present disclosure described with reference to FIG. 11 is that, when there is no connection in step S12002, the UE 100 acquires a trigger payload (S12003) to confirm whether data is included in the trigger payload. When no data is included, the UE 100 takes it that the SCS 300 waits for an IP address to be reported from the UE 100 to transmit data reported from the AS 400. Therefore, the UE 100 performs connection establishment processing (S12007), inserts the SC header including the IP address into the trigger payload, and transmits a trigger response including the trigger payload (S12008, S12009).

On the other hand, when data is included, the UE 100 includes delay report information on the IP address in the SC header, inserts the SC header into the trigger payload (S12005), and transmits a trigger response including the trigger payload (S12006). Then, the UE 100 performs connection establishment processing concurrently (S12007), inserts, into the trigger payload, the SC header including an IP address allocated to the established connection (S12008), and retransmits a trigger response including the trigger payload (S12009). When receiving a trigger report including a delay notice of the IP address, the SCS 300 holds the delay notice in association with the ID of the UE 100. Then, when receiving data reported from the AS 400 to the UE 100, the SCS 300 determines to wait until an IP address is reported from the UE 100, rather than to transmit a trigger request even if not holding the IP address of the UE 100. Then, when the IP address is reported from the UE 100, the SCS 300 transmits data received from the AS 400 to the UE 100 using an IP packet.

Further, as a second example of operation of the SCS 300 and the UE 100 in the second embodiment of the present disclosure, the SCS 300 includes the SC header in the trigger payload of a trigger request to be transmitted to the IWF 210. In this case, the SCS 300 inserts, into the trigger payload, data received from the AS 400 and to which the SC header prepended. In the field in which the IP address of this SC header is included, the IP address of the SCS 300 may also be included. Further, in the field in which an application ID of this SC header is included, the identifier of the AS 400 or the identifier of an application running on the AS 400 may be included.

When the size of data acquired from the AS 400 is larger than the size of the trigger payload, the SCS 300 may include the SC header in the trigger payload to request the UE 100 to report the IP address. In this case, the SCS 300 may insert, into the trigger payload, data obtained by adding the SC header to a part of data reported from the AS 400, or insert only the SC header into the trigger payload. The SCS 300 holds data that has not put in the trigger payload until the IF address is reported from the UE 100, and after acquiring the IP address of the UE 100, the SCS 300 transmits the data to the UE 100 as an IP packet.

Note that the SCS 300 may explicitly include, in the SC header, information indicating that the report of an IP address of the UE 100 is being requested. For example, a flag indicating that the report of the IP address is being requested may be set in the SC header or the field in which the IP address of the UE 100 is included is emptied (zero value) or set to any value to indicate that the report of the IP address of the UE 100 is being requested. Conversely, information indicating that the report of the IP address of the UE 100 is not required may be explicitly included in the SC header.

The NAS layer of the UE 100 that received the device trigger passes the trigger payload included in the device trigger to the SC layer. When the SC header is included in the trigger payload or when information for requesting the report of the IP address is included in the SC header, the SC layer determines that the IP address needs to be reported to the SCS 300, inserts, into a trigger response, the trigger payload including the SC header with the IP address set therein, and transmits the trigger response. Further, the SC layer identifies (starts) a target application from an application ID included in the SC header, and reports, to the application, remaining information after removing the SC header as data. Further, when the IP address of the SCS 300 is included in the SC header, the SC layer acquires the IP address and uses it as a destination address upon transmission of an IP packet to the SCS 300.

Thus, the UE 100 confirms whether there is an SC header in the trigger payload of the device trigger received or confirms the content of the SC header to determine whether the IP address needs to be reported to the SCS 300.

As described above, according to the second embodiment of the present disclosure, the UE 100 can determine whether to report the IP address to the SCS 300 by confirming the trigger payload of the device trigger received. Further, after establishing a connection, the UE 100 may give the SCS 300 advance notice that the UE 100 will report the IP address though not need to report the IP address immediately. This allows the SCS 300 to determine to wait for the report of the IP address from the UE 100, rather than to transmit a device trigger request immediately, even if there is data to be transmitted to the UE 100 using an IP packet. This can eliminate the transmission of an unnecessary device trigger request.

In one aspect of the present disclosure, the connection management unit in a communication terminal may newly establish an IP connection upon acquiring the IP address when the IP connection has not been established.

Further, in one aspect of the present disclosure, the response message transmitting unit in the communication terminal may insert the IP address into a field in which application information in the response message is set.

Further, in one aspect of the present disclosure, the response message transmitting unit in the communication terminal may determine to perform communication using an IP packet when no application data is included in the control message.

Further, in one aspect of the present disclosure, the response message transmitting unit in the communication terminal may determine to perform communication using an IF packet when the communication terminal has application data to be transmitted to the predetermined communication device.

Further, in one aspect of the present disclosure, there can be included a server for mediating communication between a communication terminal and an application server, the server including: a trigger request transmitting unit for transmitting a trigger request to a network node to request the transmission of a control message to the communication terminal when acquiring data from the application server; a report receiving unit for receiving a report message including an IP address from the network node that received a response message including the IF address of the communication terminal, where the response message is a response message to the control message transmitted from the network to the communication terminal based on the trigger request, and acquiring the IP address of the communication terminal included in the report message; and a communication terminal information holding unit for holding the IP address and identification information on the communication terminal in association with each other.

Further, in one aspect of the present disclosure, the server may be configured such that the IP address is inserted in a field in which application information of the report message is set.

Further, in one aspect of the present disclosure, the server may be configured to further include an IP packet receiving unit for reporting a payload included in an IP packet to the application server when the source address of the received IP packet matches an IP address held in the communication terminal information holding unit.

Note, for example, that each of the aspects of the above disclosed contents can be combined arbitrarily. Further, in addition to the communication terminal and the server, one aspect of the present disclosure may be implemented by a method executed by a communication terminal and the like, a program for causing a computer to execute this method, or a recording medium on which this program is recorded.

Each functional block used in the description of each of the aforementioned embodiments can be implemented in hardware, software, or a combination thereof. For example, each functional block included in each device shown in each block diagram or each processing unit having an equivalent function may be implemented by hardware components of any computer, such as a CPU, a memory, and various interfaces including a communication interface. Further, each functional block or each processing unit may be realized by causing a computer to execute a program describing an operation related to each function. Further, each flowchart or sequence chart in the aforementioned embodiments may be implemented by hardware components such as a CPU and a memory.

Note that each functional block, each step in each flowchart, and each process in each sequence chart used in the description of each of the aforementioned embodiments can be realized as an LSI that is typically an integrated circuit. These can be individually formed into a single chip, or some or all of them can be included and formed into a single chip. Although referred to here as the LSI, the integrated circuit may be referred to as an IC, a system LSI, a super LSI, or an ultra LSI depending on differences in integration. The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used. Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The present disclosure has an advantageous effect of being able to include the IP address of the UE in a trigger response as a control message and report it to the SCS before starting communication with the SCS. The present disclosure is applicable to communication technology (particularly to M2M communication technology) using a cellular communication function.

The invention claimed is:

1. A communication terminal for performing communication with a predetermined communication device through a network, comprising one or more hardware components configured to:
    receive, by the communication terminal, a control message from the network, the control message being generated based on a trigger request message and being transmitted to the communication terminal, the trigger request message being transmitted from the predetermined communication device and being for requesting transmission of the control message;
    determine, by the communication terminal, whether to perform the communication with the predetermined communication device using an IP packet;
    acquire, by the communication terminal, a trigger payload included in the trigger request message;
    determine, by the communication terminal, whether data is included in the trigger payload;
    when no data is included in the trigger payload, acquire, by the communication terminal, an IP address allocated to an IP connection used in the communication with the predetermined communication device when determining to perform the communication using the IP packet at the time of receiving the control message;
    insert the IP address into the trigger payload; and
    transmit, by the communication terminal, a response message, the response message being transmitted to the network in response to the control message, where the response message includes the acquired IP address.

2. The communication terminal according to claim 1, configured to, upon acquiring the IP address, newly establish an IP connection when the IP connection has not been established.

3. The communication terminal according to claim 1, configured to insert the IP address into a field in which application information in the response message is set.

4. The communication terminal according to claim 1, configured to, when no application data is included in the control message, determine to perform the communication using the IP packet.

5. The communication terminal according to claim 1, configured to, when the communication terminal has application data to be transmitted to the predetermined communication device, determine to perform the communication using the IP packet.

6. A server for mediating communication between a communication terminal and an application server, comprising one or more hardware components configured to:
    transmit, by the server, a trigger request to a network node when data is acquired from the application server, the trigger request being for requesting transmission of a control message, and the control message being transmitted from the network node to the communication terminal based on the trigger request;
    receive, by the server, a report message including an IP address from the network node that received a response message including the IP address of the communication terminal, where the response message is transmitted from the communication terminal in response to the control message;
    acquire, by the server, a trigger payload included in the trigger request message; determine, by the server, whether data is included in the trigger payload;
    when data is included in the trigger payload, acquire, by the server, the IP address of the communication terminal included in the report message;
    insert the IP address into the trigger payload; and
    hold, by the server, the IP address and identification information on the communication terminal in association with each other.

7. The server according to claim 6, wherein the IP address is inserted in a field in which application information of the report message is set.

8. The server according to claim 6, further configured to report a payload included in an IP packet to the application server when the source address of the received IP packet matches the IP address held in the server.

9. A communication terminal for performing communication with a predetermined communication device through a network, comprising one or more hardware components configured to:
    receive, by the communication terminal, a control message from the network, the control message being generated based on a trigger request message and being transmitted to the communication terminal, the trigger request message being transmitted from the predetermined communication device and being for requesting transmission of the control message;

acquire, by the communication terminal, a trigger payload included in the trigger request message;

determine, by the communication terminal, whether data is included in the trigger payload;

when no data is included in the trigger payload, determine, by the communication terminal, whether to perform the communication with the predetermined communication device using an IP packet by confirming whether there is a connection for performing communication with the predetermined communication device;

if there is no connection for performing communication with the predetermined communication device, newly establish, by the communication terminal, an IP connection with the predetermined communication device;

if there is a connection for performing communication with the predetermined communication device:
  acquire, by the communication terminal, an IP address allocated to an IP connection used in the communication with the predetermined communication device at the time of receiving the control message;
  insert, by the communication terminal, the IP address into the trigger payload; and
  transmit, by the communication terminal, a response message to the network in response to the control message, wherein the response message includes the acquired IP address.

* * * * *